United States Patent
Xia et al.

(10) Patent No.: US 10,958,946 B2
(45) Date of Patent: Mar. 23, 2021

(54) LIVE TIME-SHIFTED VIDEO PLAY-CONTINUING METHOD AND IPTV PLAYER

(71) Applicant: AMLOGIC (SHANGHAI) CO., LTD., Shanghai (CN)

(72) Inventors: Yinli Xia, Shanghai (CN); Zhizhong Zhang, Shanghai (CN)

(73) Assignee: AMLOGIC (SHANGHAI) CO., LTD.

( * ) Notice: Subject to any disclaimer, the term of this patent is extended or adjusted under 35 U.S.C. 154(b) by 0 days.

(21) Appl. No.: 16/705,759

(22) Filed: Dec. 6, 2019

(65) Prior Publication Data
US 2020/0186840 A1    Jun. 11, 2020

(30) Foreign Application Priority Data
Dec. 7, 2018    (CN) .......................... 201811496755.X (51) Int. Cl.
| H04N 7/173 | (2011.01) |
| H04N 21/2187 | (2011.01) |
| H04N 21/414 | (2011.01) |
| H04N 21/442 | (2011.01) |
| H04N 21/643 | (2011.01) |
| H04N 21/6437 | (2011.01) |
| H04N 21/845 | (2011.01) |

(52) U.S. Cl.
CPC ... *H04N 21/2187* (2013.01); *H04N 21/41407* (2013.01); *H04N 21/44209* (2013.01); *H04N 21/6437* (2013.01); *H04N 21/64322* (2013.01); *H04N 21/8456* (2013.01)

(58) Field of Classification Search
None
See application file for complete search history.

(56) References Cited

U.S. PATENT DOCUMENTS

| 8,176,195 | B2 * | 5/2012 | Tian | ................... | H04N 21/8456 709/231 |
| 8,423,071 | B1 * | 4/2013 | Sun | ......................... | H04L 65/80 455/522 |
| 2003/0097659 | A1 * | 5/2003 | Goldman | ........... | H04N 21/2387 725/89 |

(Continued)

FOREIGN PATENT DOCUMENTS

| CN | 101401427 A | 4/2009 |
| CN | 12724566 A | 10/2012 |

*Primary Examiner* — William J Kim
(74) *Attorney, Agent, or Firm* — Ostrolenk Faber LLP (57) ABSTRACT

The invention provides a live time-shifted video play-continuing method during disconnection and an IPTV player. The method comprises: connecting to a network to obtain a data stream of a video; playing the data stream through a player to obtain a play starting time of the video; acquiring a played duration of the video when the network is disconnected; acquiring a time point of playing interruption of the video according to the play starting time and the played duration when the network is connected again; and returning to the time point through the player, and continuing to play the video at the time point. The beneficial effects of the invention are as follows: directly performing the breakpoint continuous playing of the live time-shifted video from the network disconnection time point after the network is reconnected.

16 Claims, 6 Drawing Sheets

(56) References Cited

U.S. PATENT DOCUMENTS

| | | | | |
|---|---|---|---|---|
| 2004/0055014 A1* | 3/2004 | Edelson | H04N 21/6581 | 725/110 |
| 2004/0163115 A1* | 8/2004 | Butzer | H04N 21/23424 | 725/88 |
| 2005/0201485 A1* | 9/2005 | Fay | H04N 21/643 | 375/295 |
| 2006/0041904 A1* | 2/2006 | Lee | H04N 21/4667 | 725/28 |
| 2006/0095401 A1* | 5/2006 | Krikorian | H04N 19/172 | |
| 2006/0174273 A1* | 8/2006 | Park | G06F 3/0482 | 725/41 |
| 2006/0233524 A1* | 10/2006 | Masuo | H04N 21/47202 | 386/262 |
| 2007/0113257 A1* | 5/2007 | Takemoto | H04N 21/4784 | 725/131 |
| 2008/0168178 A1* | 7/2008 | Bouazizi | H04N 21/4305 | 709/231 |
| 2011/0007745 A1* | 1/2011 | Schultz | H04N 5/76 | 370/394 |
| 2013/0024901 A1* | 1/2013 | Sharif-Ahmadi | H04L 65/605 | 725/114 |
| 2013/0229270 A1* | 9/2013 | Srinivasan | H04W 36/22 | 340/328 |
| 2013/0332825 A1* | 12/2013 | Singh | H04H 60/31 | 715/273 |
| 2014/0208349 A1* | 7/2014 | Nair | H04N 21/6125 | 725/34 |
| 2015/0143394 A1* | 5/2015 | Hijikata | H04N 21/44222 | 725/14 |
| 2016/0182935 A1* | 6/2016 | Augui | H04N 21/422 | 725/37 |
| 2016/0191991 A1* | 6/2016 | Bruhn | H04N 21/4135 | 725/80 |
| 2017/0019709 A1* | 1/2017 | Gaur | H04N 21/4334 | |
| 2019/0082229 A1* | 3/2019 | Grumer | H04N 21/4751 | |
| 2019/0306581 A1* | 10/2019 | Her | H04H 60/31 | |
| 2020/0145618 A1* | 5/2020 | Moriyama | H04N 21/4532 | |

\* cited by examiner

Step S1, connecting to a network to obtain a data stream of the video;

Step S2, processing the data stream to obtain a play starting time of the video;

Step S3, acquiring a played duration of the video in the player when network is disconnected;

Step S4, acquiring a time point of playing interruption of the video according to the play starting time and the played duration when network is connected again;

Step S5, Returning to the time point through the player, and continuing to play the video at the time point.

LIVE TIME-SHIFTED VIDEO PLAY-CONTINUING METHOD AND IPTV PLAYER

CROSS-REFERENCE TO RELATED APPLICATIONS

The present application claims priority to and the benefit of Chinese Patent Application No. CN 201811496755.X filed on Dec. 7, 2018, the entire content of which is incorporated herein by reference.

BACKGROUND OF THE INVENTION

1. Field of the Invention

The invention relates to the field of communication technologies, and more particularly, to a live time-shifted video play-continuing method during disconnection and an IPTV player.

2. Description of the Related Art

IPTV (Internet Protocol Television) is a brand-new technology incorporating internet technology, multimedia technology, and communication technology, etc, aiming to deliver various interactive services (for example, digital TVs) to family members via a broadband network. With the development of internet technology, an increasing number of people pay more attention to live web-cast, which in turn brings people to focus more on time shifting. People are allowed to watch live TV programs, major events and news by using network signals, offering people more choices over the contents they desire to watch. When a user plays a live and time-shifted video by using an IPTV box, the video may be caused to stop due to the instability of internet. In this case, it is expected that the video may resume playing from a point at which the video is paused after the network is connected again. However, it should be understood that an optimum solution dedicated to this issue is unavailable in the market due to the fact that there are too many resources in the internet.

SUMMARY OF THE INVENTION

Given that the foregoing problems exist in the prior art, the present invention provides a live time-shifted video play-continuing method during disconnection from a disconnection time point, and an IPTV player.

The detailed technical solution is as follows:

A live time-shifted video play-continuing method during disconnection, provides a player for playing a live time-shifted video, wherein the method comprises the steps of:

Step S1, connecting to a network to obtain a data stream of the video;

Step S2, playing the data stream through a player to obtain a play starting time of the video;

Step S3, acquiring a played duration of the video in the player when network is disconnected;

Step S4, acquiring a time point of playing interruption of the video according to the play starting time and the played duration when network is connected again; and Step S5, returning to the time point through the player, and continuing to play the video at the time point.

Preferably, in the above-mentioned method, wherein Step S1 comprises: obtaining the data stream of the video via Real-Time Transport Control Protocol (RTCP).

Preferably, in the above-mentioned method, wherein Step S2 comprises: when the player is playing the data stream, obtaining the play starting time of the video by decoding the data stream.

Preferably, in the above-mentioned method, wherein in Step S1, the data stream of the video is obtained via Real-Time Transport Control Protocol (RTCP); and in Step S2, it further comprises obtaining the play starting time by analyzing a header field via the RTCP when decoding the data stream.

Preferably, in the above-mentioned method, wherein Step S2 further comprises: obtaining the play starting time by analyzing the header field via the RTCP in the player when decoding the data stream; and/or the player is a ctcplayer.

Preferably, in the above-mentioned method, wherein in Step S3, the player detects network connection status in real time;

when the player detects that the network is disconnected, recording the played duration of the video in the player.

Preferably, in the above-mentioned method, wherein Step S4 further comprises: the player detects the network connection status in real time;

when the player detects that the network is connected again, splicing the play starting time and the played duration to obtain the time point.

Preferably, in the above-mentioned method, wherein Step S5 further comprises: returning to the time point by searching the time of the player, and continuing to play the video at the time point.

An IPTV player for plying a live time-shifted video is provided, comprising: a display, a processor, an internal memory, an external memory, and a communicator, the processor being connected to the display, the internal memory, the external memory, and the communicator, respectively, and further comprising: an operating system, wherein the processor is configured to run the operating system, the operating system runs a playing application, and the playing application comprises:

a data stream acquisition module for acquiring a data stream of the video after the communicator is connected to the network;

a play starting time acquisition module, connected to the data stream acquisition module, configured to acquire the play starting time of the video when the IPTV player plays the data stream;

a played duration acquisition module, connected to the play starting time acquisition module, configured to acquire a played duration of the video in the IPTV player when the communicator is disconnected from the network;

an interruption time point acquisition module, connected to the play starting time acquisition module and the played duration acquisition module, respectively, and configured to acquire a time point of playing interruption of the video according to the play starting time and the playing length when the communicator is connected to the network again; and a playing module, connected to the interruption time point acquisition module, and configured to continue to play the video from the time point.

Preferably, in the IPTV player, the data stream acquisition module comprises a data stream acquisition unit for acquiring the data stream of the video via Real-Time Transport Control Protocol (RTCP).

Preferably, in the IPTV player, the play starting time acquisition module comprises:

a play starting time acquisition unit for acquiring the play starting time of the video by decoding the data stream when the data stream is played.

Preferably, in the IPTV player, the data stream acquisition module comprises a data stream acquisition unit for acquiring the data stream of the video via Real-Time Transport Control Protocol (RTCP);

the play starting time acquisition module comprises a decoding unit, applied to a decoding operation, and configured to acquire the play starting time of the video via RTCP.

Preferably, in the IPTV player, the decoding unit comprises:

a decoding component, applied to a decoding operation, and configured to acquire the play starting time of the video in the IPTV player via RTCP.

Preferably, in the IPTV player, the played duration acquisition module comprises:

a first network detection unit for detecting connection status between the communicator and the network;

a played duration recording unit, connected to the first network detection unit, and configured to record the played duration of the video in the IPTV player when the first network detection unit detects that the communicator is disconnected from the network.

Preferably, in the IPTV player, the interruption time point acquisition module comprises:

a second network detection unit for detecting connection status between the communicator and the network;

an interruption time point computing unit, connected to the second network detection unit, and configured to splice the play starting time and the played duration to obtain the time point when the second network detection unit detects that the communicator is connected to the network again.

Preferably, in the IPTV player, the playing module comprises:

a search unit for searching for the time point based on the time which the IPTV player plays and retrieves the time point; and a playing unit, connected to the search unit, and configured to start to continue to play the video from the time point.

Preferably, in above-mentioned the IPTV player, wherein the operating system is an Android operating system.

The beneficial effects of the invention are as follows: obtaining the disconnection time point by acquiring the play starting time and the playing duration of the live time-shifted video, and directly performing the breakpoint continuous playing of the live time-shifted video from the network disconnection time point after the network is reconnected.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

Figure 1:
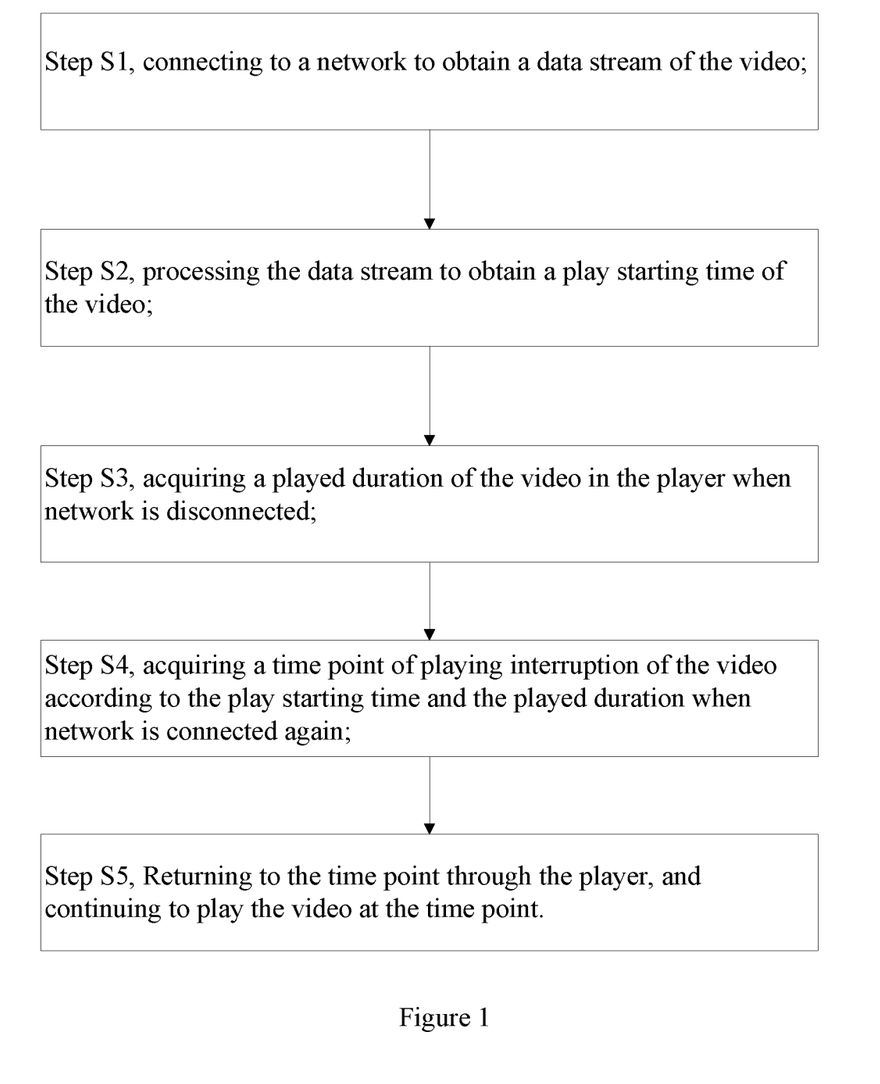
FIG. 1 is a flowchart for an embodiment of a live time-shifted video play-continuing method during disconnection according to the present invention.

The invention provides a live time-shifted video play-continuing method during disconnection, wherein a player is provided for playing a live time-shifted video, and as shown in FIG. 1, the method comprises the steps of:

Step S1, connecting to a network to obtain a data stream of the video;

Step S2, playing the data stream through a player to obtain a play starting time of the video;

Step S3, acquiring a played duration of the video in the player when network is disconnected;

Step S4, acquiring a time point of playing interruption of according to the play starting time and the played duration when network is connected again; and Step S5, returning to the time point through the player, and continuing to play the video at the time point.

Furthermore, as a preferred embodiment, the player plays the live time-shifted video by using the above-mentioned live time-shifted video play-continuing method during disconnection; when the player plays the live time-shifted video, that is, when the player is connected to the network, the player plays the data stream and obtains a play starting time of the live time-shifted video. The player detects network connection status in real time when playing the live time-shifted video. When the player detects that the network is available, the player continues playing the current live time-shifted video; when the player detects that the network is disconnected, acquiring the played duration of the video in the player; and when is the player detects that the network is connected again, acquiring the time point of playing interruption of the video according to the play starting time and the played duration. Then the player returns to the time point, and continues to play the live time-shifted video at the time point. It is determined obtaining the disconnection time point by acquiring the play starting time and the playing duration of the live time-shifted video, and directly performing the breakpoint continuous playing of the live time-shifted video from the network disconnection time point after the network is reconnected.

Furthermore, in the above-mentioned embodiment, Step S1 comprises: obtaining the data stream of the video via Real-Time Transport Control Protocol (RTCP).

Furthermore, in the above-mentioned embodiment, Step S2 comprises: when the player is playing the data stream, obtaining the play starting time of the video by decoding the data stream.

Furthermore, in the above-mentioned embodiment, in Step S1, the data stream of the video is obtained via Real-Time Transport Control Protocol (RTCP); and in Step S2, it further comprises obtaining the play starting time by analyzing a header field via the RTCP when decoding the data stream.

Furthermore, in the above-mentioned embodiment, Step S2 further comprises: obtaining the play starting time by analyzing the header field via the RTCP in the player when decoding the data stream, and the play starting time is recorded as t1.

Furthermore, in the above-mentioned embodiment, the player is a ctcplayer.

Furthermore, in the above-mentioned embodiment, in Step S3, the player detects network connection status in real time;

when the player detects that the network is disconnected, recording the played duration of the video in the player, and the playing duration is recorded as t2.

Furthermore, in the above-mentioned embodiment, in Step S4, the player detects the network connection status in real time;

when the player detects that the network is connected again, splicing the play starting time and the played duration, to obtain the time point, and the time point is recorded as t3, that is, t3=t1+t2. Wherein, the time point t3 is obtained by splicing the play starting time point and the played duration.

Furthermore, in the above-mentioned embodiment, Step S5 further comprises: returning to the time point by searching the time of the player, and continuing to play the video at the time point.

The invention further comprises an IPTV player for playing a live time-shifted video, the device comprising:

an operating system, wherein the operating system runs a playing application, wherein the playing application uses any one of the live time-shifted video play-continuing methods during disconnection as described above.

Furthermore, in the above-mentioned embodiment, the operating system is an Android operating system.

Figure 2:
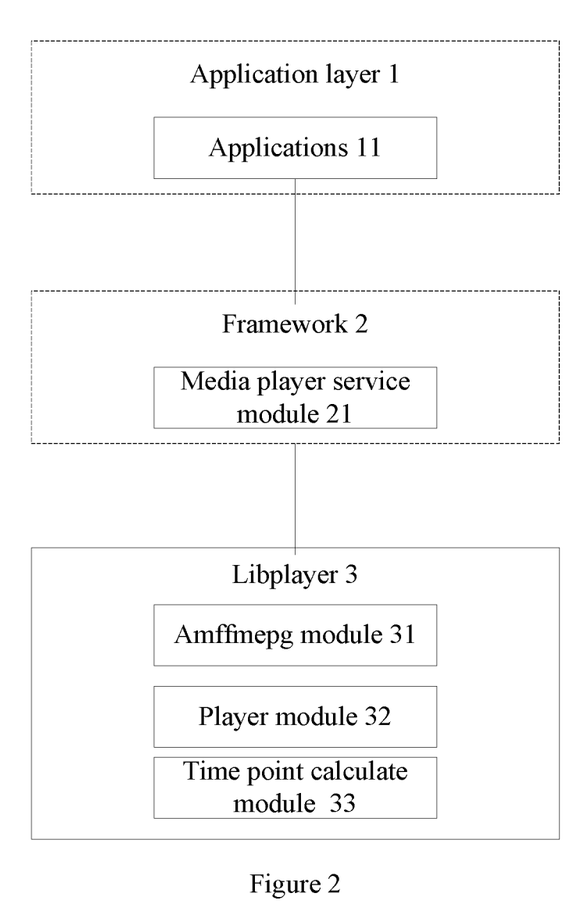
FIG. 2 is a schematic diagram illustrating an operating system of an IPTV player according to an embodiment of the present invention.

Furthermore, as a preferred embodiment, as shown in FIG. 2, the Android operating system of the IPTV player comprises: an application layer 1, a framework 2, and a libplayer 3, wherein the application layer 1 has applications (AndroidPackage(APK), and the APK acquires a web address of a video through URL (Uniform Resource Locator); in the framework 2, a media player service module 21 (mediaplayerservice) application parses the video information, and creates a message thread using a notification mechanism, so as to trigger the invoking.

Furthermore, in the above-mentioned embodiment, when the player begins to play the live time-shifted video, that is, when the player is connected to the network, the data stream of the live time-shifted video is obtained, and the data stream may send a great deal of data information. The data information comprises header fields, including a field "Range: clock=%Y%m%dT%H%M%S.00Z". The above-mentioned field comprises temporal information related to the play starting time of the live time-shifted video. Since a process in which the above-mentioned header fields are parsed is added to a unit for RTCP in a ffmpeg parsing module, the player is allowed to parse the above-mentioned header fields. Accordingly, when the video is decoded, the header field may be analyzed via RTCP, so as to obtain and save the play starting time, and the play staring time is recorded as t1.

Wherein, % Y represents a year with the century's number in decimal;

% m represents a month in decimal;

% d represents the day of the month in decimal;

% H represents an hour in a 24-hour system;

% M represents minutes in decimal;

% S represents seconds in decimal;

% Z represents a time zone name, that is, if no time zone name is available, a null character is returned.

Furthermore, as a preferred embodiment, it should be noted that when a message indicating the network is disconnected is received by the framework 2, the message thread is triggered and the message of network disconnection is sent to the libplayer 3; then the message of network disconnection is received by the libplayer 3, such that the played duration is obtained.

The notification mechanism acts to save an operation that should be performed in a chain (notification chain) when the event occurs by the function pointer for a person to be notified of the event, and then the notifier sequentially executes the callback function of each element in the linked list when the event occurs, and notification is completed. The above mentioned message thread is written with a seek function.

A player module 32 in the libplayer 3 is used to play the live time-shifted video. An Amffmepg module 31 invokes a unit for RTCP in a ffmpeg parsing module to obtain the play starting time; a time point calculate module 33 in the libplayer 3 performs searching of the time.

The time search in the libplayer 3 may be performed by the seek function.

Figure 3:
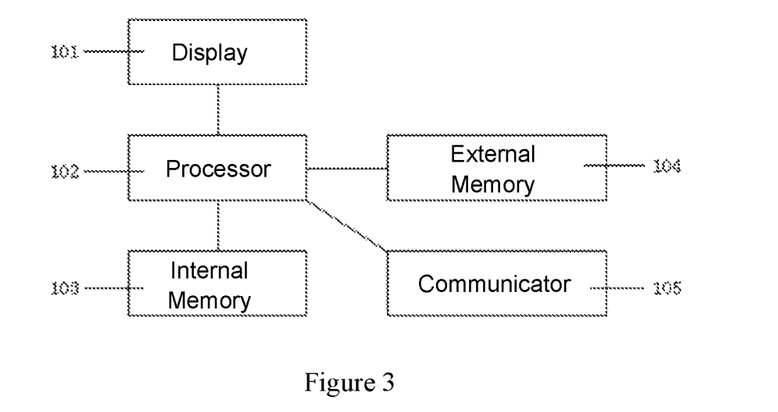
FIG. 3 is a schematic diagram showing a structure of the IPTV player according to an embodiment of the present invention.
Figure 4:
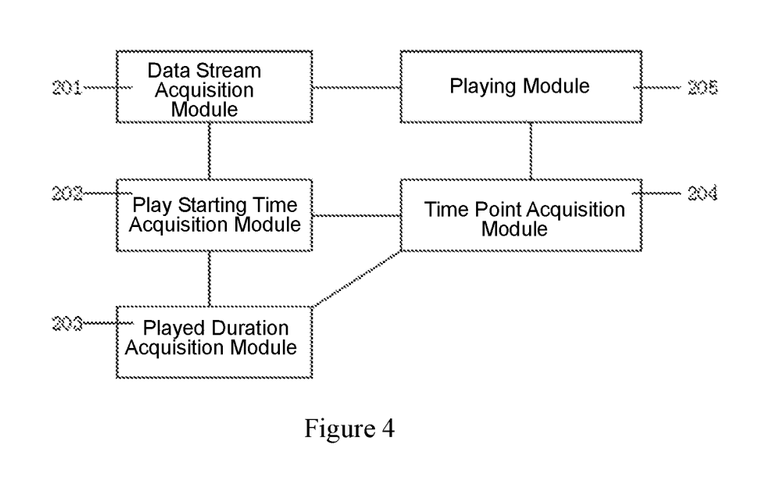
FIG. 4 is a schematic diagram showing a structure of a playing application of the IPTV player according to an embodiment of the present invention.

Furthermore, as shown in FIG. 3, an IPTV player comprises: a display 101, a processor 102, an internal memory 103, an external memory 104, and a communicator 105, the processor 102 being connected to the display 101, the internal memory 103, the external memory 104, and the communicator 105, respectively, and further comprising: an operating system, wherein the processor 102 is configured to run the operating system, the operating system runs a playing application, and as shown in FIG. 4, the playing application comprises:

a data stream acquisition module 201 for acquiring a data stream of the video after the communicator 105 is connected to the network;

a play starting time acquisition module 202, connected to the data stream acquisition module 201, configured to acquire the play starting time of the video when the IPTV player plays the data stream;

a played duration acquisition module 203, connected to the play starting time acquisition module 202, configured to acquire a played duration of the video in the IPTV player when the communicator 105 is disconnected from the network;

a time point acquisition module 204, connected to the play starting time acquisition module 202 and the played duration acquisition module 203, respectively, and configured to acquire a time point of playing interruption of the video according to the play starting time and the playing length when the communicator 105 is connected to the network again; and a playing module 205, connected to the time point acquisition module 204, and configured to continue to play the video from the time point.

Furthermore, as a preferred embodiment, when the IPTV player plays the live time-shifted video, that is, when the communicator 105 in the IPTV player connects to network, the data stream acquisition module 201 plays the data stream, and the play starting time acquisition module 202 acquires the play starting time of the live time-shifted video; the IPTV player detects the network connection status in real time when it plays the live time-shifted video, when network is connected, the IPTV player continues to play the live time-shifted video; when the network is disconnected, the played duration acquisition module 203 acquires a played duration of the live time-shifted video in the player; when network is connected again, the time point acquisition module 204 acquires a time point of playing interruption of the video according to the play starting time and the playing time length, and the playing module 205 returns to the time point and continues to play the live time-shifted video from the time point. Obtaining the disconnection time point by acquiring the play starting time and the playing duration of the live time-shifted video, and directly performing the breakpoint continuous playing of the live time-shifted video from the network disconnection time point after the network is reconnected.

Figure 5:
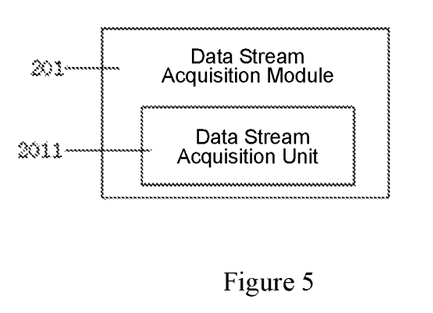
FIG. 5 is a schematic diagram showing a structure of a data stream acquisition module of the IPTV player according to an embodiment of the present invention.

Furthermore, in the above-mentioned embodiment, as shown in FIG. 5, the data stream acquisition module 201 comprises a data stream acquisition unit 2011 for acquiring the data stream of the video via Real-Time Transport Control Protocol (RTCP).

Figure 6:
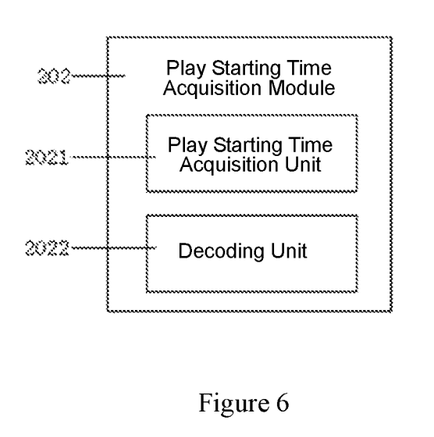
FIG. 6 is a schematic diagram showing a structure of a play starting time acquisition module of the IPTV player according to an embodiment of the present invention.

Furthermore, in the above-mentioned embodiment, as shown in FIG. 6, the play starting time acquisition module 202 comprises:

a play starting time acquisition unit 2021 for acquiring the play starting time of the video by decoding the data stream when the data stream is played.

Furthermore, in the above-mentioned embodiment, the data stream acquisition module 201 comprises a data stream acquisition unit 2011 for acquiring the data stream of the video via Real-Time Transport Control Protocol (RTCP);

as shown in FIG. 6, the play starting time acquisition module 202 comprises a decoding unit 2022, applied to a decoding operation, and configured to acquire the play starting time of the video via RTCP.

Figure 7:
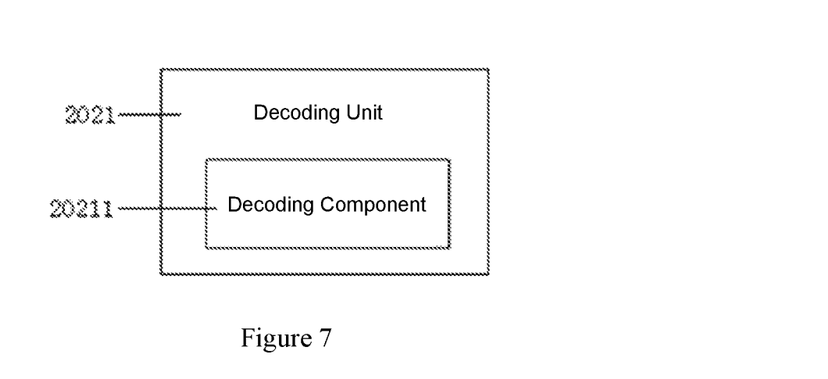
FIG. 7 is a schematic diagram showing a structure of a decoding unit of the IPTV player according to an embodiment of the present invention.

Furthermore, in the above-mentioned embodiment, as shown in FIG. 7, the decoding unit 2022 comprises:

a decoding component 20221, applied to a decoding operation, and configured to acquire the play starting time of the video in the IPTV player via RTCP.

Figure 8:
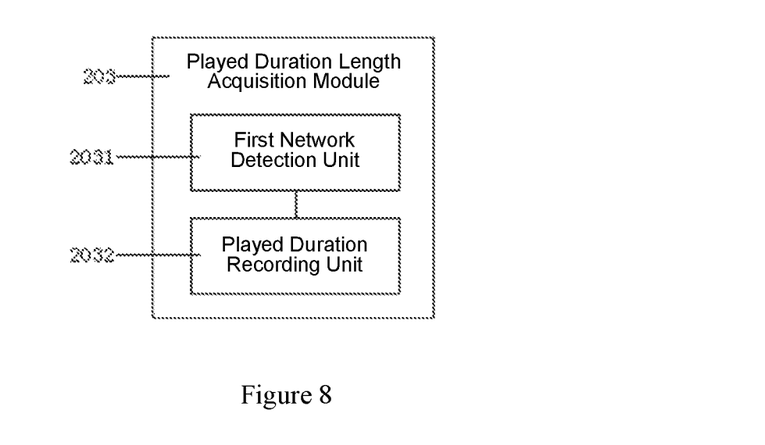
FIG. 8 is a schematic diagram showing a structure of a played duration acquisition module of the IPTV player according to an embodiment of the present invention.

Furthermore, in the above-mentioned embodiment, as shown in FIG. 8, the played duration acquisition module 203 comprises:

a first network detection unit 2031 for detecting connection status between the communicator 105 and the network;

a played duration recording unit 2032, connected to the first network detection unit 2031, and configured to record the played duration of the video in the IPTV player when the first network detection unit 2031 detects that the communicator 105 is disconnected from the network.

Figure 9:
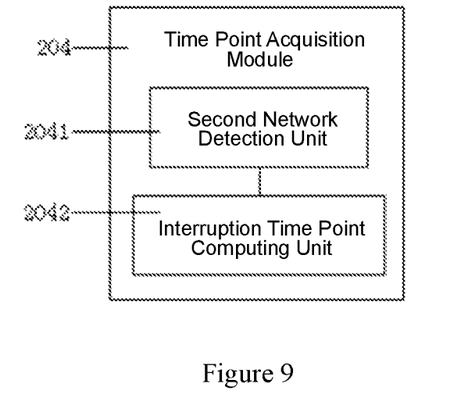
FIG. 9 is a schematic diagram showing a structure of a time point acquisition module of the IPTV player according to an embodiment of the present invention.

Furthermore, in the above-mentioned embodiment, as shown in FIG. 9, the time point acquisition module 204 comprises:

a second network detection unit 2041 for detecting connection status between the communicator 105 and the network;

an interruption time point computing unit 2042, connected to the second network detection unit 2041, and configured to splice the play starting time and the played duration to obtain the time point when the second network detection unit detects that the communicator 105 is connected to the network again.

Figure 10:
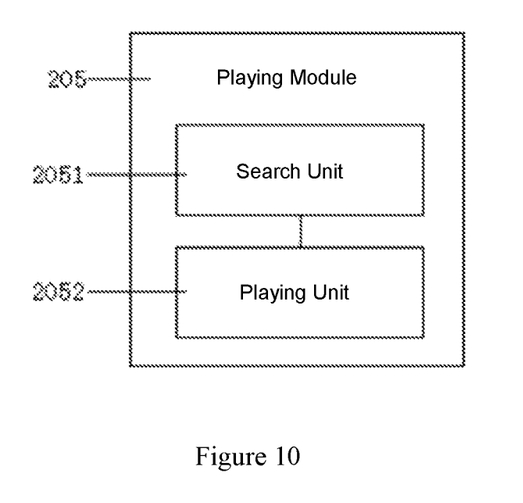
FIG. 10 is a schematic diagram showing a structure of a playing module of the IPTV player according to an embodiment of the present invention.

Furthermore, in the above-mentioned embodiment, as shown in FIG. 10, the playing module 205 comprises:

a search unit 2051 for searching for the time point based on the time which the IPTV player plays and retrieves the time point; and a playing unit 2052, connected to the search unit 2051, and configured to start to continue to play the video from the time point.

Furthermore, in the above-mentioned embodiment, the operating system is an Android operating system.

When the player plays the live time-shifted video, the libplayer 3 obtains the play starting time of the video, and detects network connection status in real time when the video is playing. When the player detects that the network is connected as expected, it continues playing the live time-shifted video; when the player detects that the network is disconnected, in case a message indicating the network is disconnected is received by the framework 2, the message thread is triggered and the message of network disconnection is sent to the libplayer 3; then the message of network disconnection is received by the libplayer 3, such that the played duration is obtained. When the network is connected again, the libplayer 3 obtains the time point of playing interruption of the video according to the play starting time and the played duration. The libplayer 3 returns a progress bar to the time point of playing interruption of the video for time-shifted broadcasting. Obtain the disconnection time point by acquiring the play starting time and the playing duration of the live time-shifted video, and directly perform the breakpoint continuous playing of the live time-shifted video from the network disconnection time point after the network is reconnected.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A live time-shifted video play-continuing method during disconnection, provides a player for playing a live time-shifted video, wherein the method comprises the steps of:
   Step S1, connecting to a network to obtain a data stream of the video;
   Step S2, playing the data stream through a player to obtain a play starting time of the video;
   Step S3, acquiring a played duration of the video in the player when network is disconnected;
   Step S4, acquiring a time point of playing interruption of the video according to the play starting time and the played duration when network is connected again; and
   Step S5, returning to the time point through the player, and continuing to play the video at the time point.

2. The live time-shifted video play-continuing method during disconnection of claim 1, wherein Step S1 comprises: obtaining the data stream of the video via Real-Time Transport Control Protocol (RTCP).

3. The live time-shifted video play-continuing method during disconnection of claim 1, wherein Step S2 comprises: when the player is playing the data stream, obtaining the play starting time of the video by decoding the data stream.

4. The live time-shifted video play-continuing method during disconnection of claim 3, wherein
   in Step S1, the data stream of the video is obtained via Real-Time Transport Control Protocol (RTCP); and
   in Step S2, it further comprises obtaining the play starting time by analyzing a header field via the RTCP when decoding the data stream.

5. The live time-shifted video play-continuing method during disconnection of claim 4, wherein Step S2 further comprises: obtaining the play starting time by analyzing the header field via the RTCP in the player when decoding the data stream.

6. The live time-shifted video play-continuing method during disconnection of claim 1, wherein in Step S3, the player detects network connection status in real time;
   when the player detects that the network is disconnected, recording the played duration of the video in the player.

7. The live time-shifted video play-continuing method during disconnection of claim 1, Step S4 further comprises: the player detects the network connection status in real time;
   when the player detects that the network is connected again, splicing the play starting time and the played duration, to obtain the time point.

8. The live time-shifted video play-continuing method during disconnection of claim 1, wherein Step S5 further comprises: returning to the time point by searching the time of the player, and continuing to play the video at the time point.

9. An IPTV player for playing a live time-shifted video, comprising: a display, a processor, an internal memory, an external memory, and a communicator, the processor being connected to the display, the internal memory, the external memory, and the communicator, respectively, and further comprising: an operating system, wherein the processor is configured to run the operating system, the operating system runs a playing application, and the playing application comprises:
   a data stream acquisition module for acquiring a data stream of the video after the communicator is connected to the network;
   a play starting time acquisition module, connected to the data stream acquisition module, configured to acquire the play starting time of the video when the IPTV player plays the data stream;
   a played duration acquisition module, connected to the play starting time acquisition module, configured to acquire a played duration of the video in the IPTV player when the communicator is disconnected from the network;
   a time point acquisition module, connected to the play starting time acquisition module and the played duration acquisition module, respectively, and configured to acquire a time point of playing interruption of the video according to the play starting time and the playing length when the communicator is connected to the network again; and
   a playing module, connected to the time point acquisition module, and configured to continue to play the video from the time point.

10. The IPTV player of claim 9, wherein the data stream acquisition module comprises:
    a data stream acquisition unit for acquiring the data stream of the video via Real-Time Transport Control Protocol (RTCP).

11. The IPTV player of claim 9, wherein the play starting time acquisition module comprises:
    a play starting time acquisition unit for acquiring the play starting time of the video by decoding the data stream when the data stream is played.

12. The IPTV player of claim 11, wherein the data stream acquisition module comprises a data stream acquisition unit for acquiring the data stream of the video via Real-Time Transport Control Protocol (RTCP);
    the play starting time acquisition module comprises a decoding unit, applied to a decoding operation, and configured to acquire the play starting time of the video via RTCP.

13. The IPTV player of claim 12, wherein the decoding unit comprises:
    a decoding component, applied to a decoding operation, and configured to acquire the play starting time of the video in the IPTV player via RTCP.

14. The IPTV player of claim 9, wherein the played duration acquisition module comprises:
    a first network detection unit for detecting connection status between the communicator and the network;
    a played duration recording unit, connected to the first network detection unit, and configured to record the played duration of the video in the IPTV player when the first network detection unit detects that the communicator is disconnected from the network.

15. The IPTV player of claim 9, wherein the time point acquisition module comprises:
    a second network detection unit for detecting connection status between the communicator and the network;
    an interruption time point computing unit, connected to the second network detection unit, and configured to splice the play starting time and the played duration to obtain the time point when the second network detection unit detects that the communicator is connected to the network again.

16. The IPTV player of claim 9, wherein the playing module comprises:
- a search unit for searching for the time point based on the time which the IPTV player plays and retrieves the time point; and
- a playing unit, connected to the search unit, and configured to start to continue to play the video from the time point.

* * * * *